A. Webb.
Horse Hoe Cultivator.
No. 2812 Reissued Dec. 17, 1867.
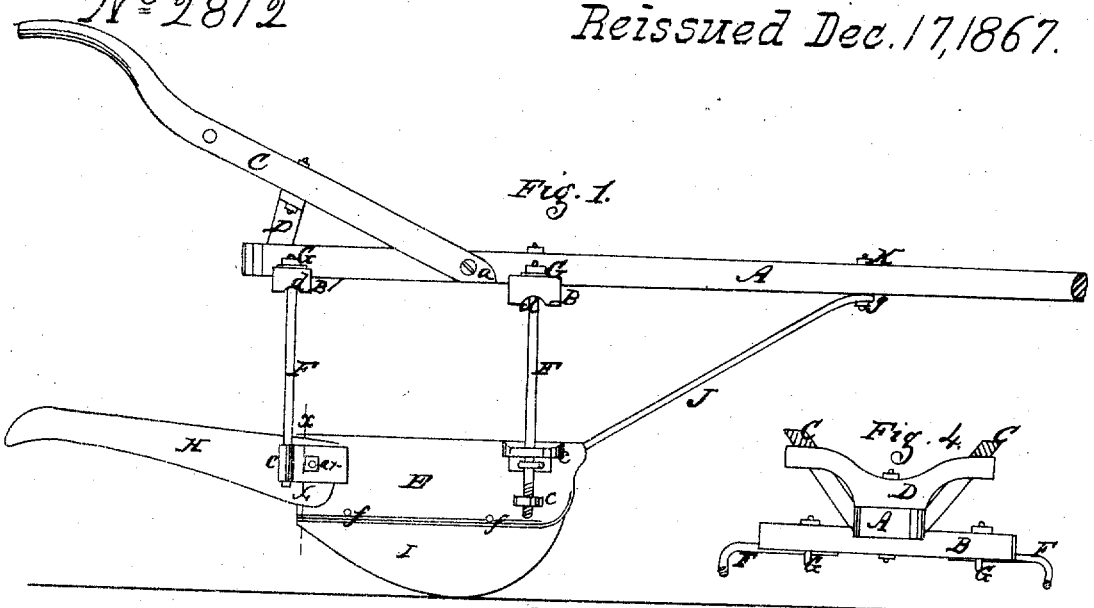
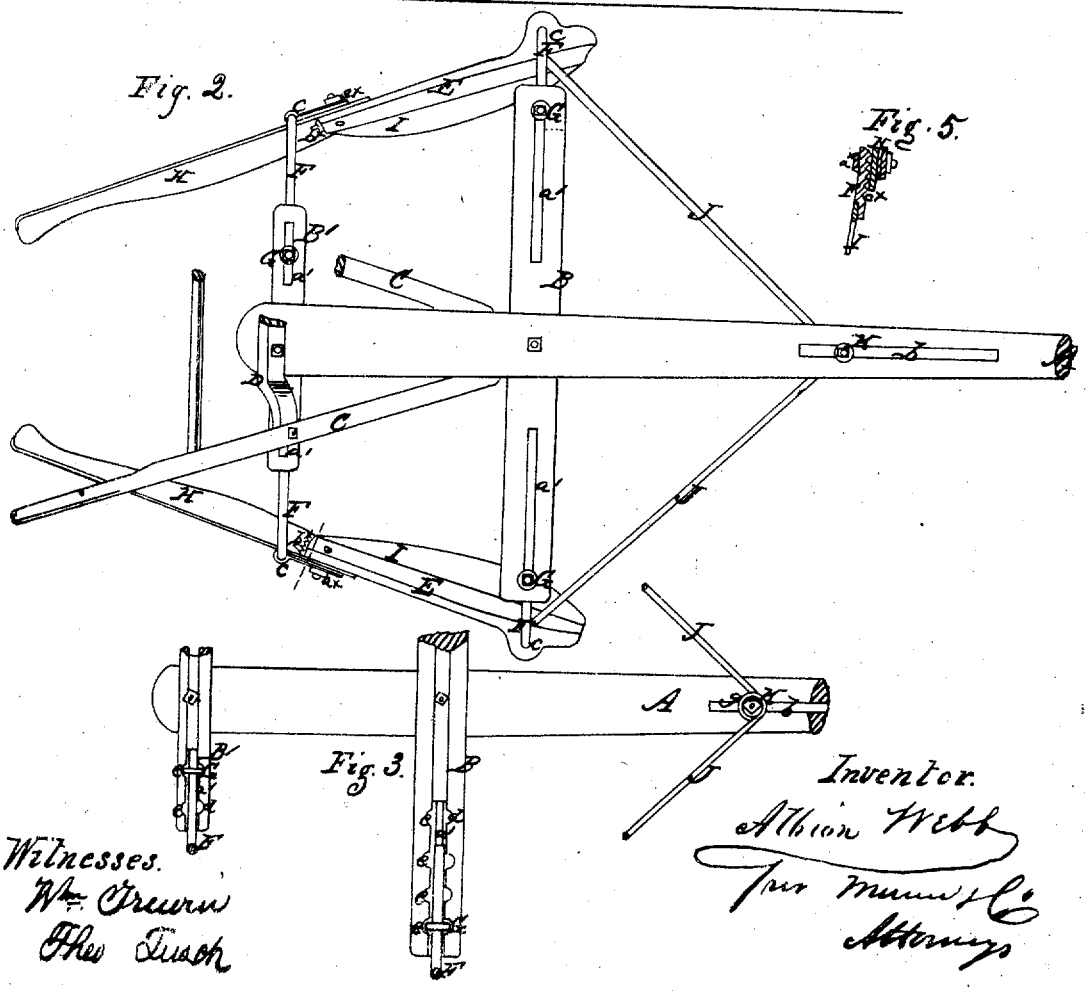
Witnesses.
Wm. Greenw
Theo Tusch
Inventor.
Albion Webb
per Munn & Co
Attorneys

UNITED STATES PATENT OFFICE.

R. B. DUNN AND JOHN C. FLINT, OF BANGOR, MAINE, ASSIGNEES, BY MESNE ASSIGNMENTS, OF ALBION WEBB, OF SAME PLACE.

IMPROVEMENT IN HORSE HOE-CULTIVATORS.

Specification forming part of Letters Patent No. 49,354, dated August 8, 1865; Reissue No. 2,812, dated December 17, 1867.

*To all whom it may concern:*

Be it known that ALBION WEBB, of Bangor, in the county Penobscot and State of Maine, has invented a new and Improved Horse Hoe or Cultivator; and we do hereby declare that the following is a full, clear, and exact description thereof, which will enable those skilled in the art to make and use the same, reference being had to the accompanying drawings, forming part of this specification, in which—

Figure 1 is a side view of the invention. Fig. 2 is a plan or top view of the same, with one of the handles and its support partly cut away. Fig. 3 is an inverted plan of a portion of the same; Fig. 4, a back view of a portion of the same. Fig. 5 is a vertical transverse section of one of the blades and plates of the invention, taken in line *x x*, Fig. 1.

Similar letters of reference indicate corresponding parts.

This invention relates to certain improvements in horse hoes or cultivators of that class which are provided with oblique hoes or shares.

The object of the invention is to render the hoes or shares of the machine capable of being truly adjusted with greater facility than hitherto, and also to render the several adjustable parts stiffer or firmer, and to enable the implement to perform or work in a better manner.

It consists in securing the share to a plate in such manner as to be readily removed from or secured thereto; also, in the employment of teeth or cogs as a means of adjustment and holding in position a movable blade; also, in providing a wing or blade and the part to which it is connected with a rib in one and a series of notches or grooves in the other, to set the blade and aid in holding it in position; also, in connection with such rib and notches, providing a bolt and nut to loosen and tighten the same as desired; also, in supporting the forward ends of the share-supporting plates by means of screw-threaded rods entering screw-threaded eyes on the plate, to admit of lowering or raising the share; also, in providing the cross-bars with slots, or their equivalents, to admit of the lateral adjustment of the shares; also, in providing the cross-bars with notches to receive the eyes of the loops which secure the share-supporting rods in the desired positions; also, in bracing or supporting the hoe-handles upon a stout yoke or block bolted to the beam, as hereinafter described.

A represents the draft-pole of the implement or machine, and B B′ are two cross-bars attached thereto, the front one, B, being considerably longer than the rear, B′, as shown clearly in Fig. 2.

C C are handles, the lower ends of which are secured by bolts *a* to the draft-pole A, and they are held in an inclined position by a curved support, hereinafter described, which is firmly bolted to the rear of the draft-pole A. The cross-bars B B′ are each slotted longitudinally at each side of the draft-pole A, as shown at *a′*, and the draft-pole also has a slot, *b*, made longitudinally in it. All of these slots are shown in Fig. 2.

E E represent two plates, which are secured or connected to the cross-bars B B′ by means of curved rods F, the lower ends of which pass through eyes *e*, attached to or cast on the exterior or outer sides of the plates E E, as shown in Fig. 1, the forward ones of these rods having screw-threads on their lower ends, adapted to screw-threads within the eyes, and which not only aid in holding the plates firmly in position, but also admit of their being adjusted vertically. The upper horizontal parts of these rods F fit in grooves *d*, made in the under sides of the cross-bars B B′, and they are secured to the latter by means of eyebolts G, which pass through the slots *a′*, the eyes of said bolts fitting in notches *e* in the under sides of said cross-bars, as shown in Fig. 3, these notches serving not only to hold the rods more securely in their positions, but also, by being placed at regular intervals apart, forming an approximate guide for adjusting both of the shares equally. By this arrangement it will be seen that the plates E E may be very readily adjusted nearer together or farther apart, and also made to have a greater or less oblique position relatively with each other, as may be required, the front ends of said plates always having a greater space between them than the rear ends, as shown in Fig. 2.

To the rear end of each plate E there is attached a wing or blade, H, the lower edges of which are curved so as to be concave, as shown clearly in Fig. 1.

To each plate E a hoe or share, I, is removably secured by rivets or bolts *f*. These hoes or shares are of convex form at their lower edges, as shown in Fig. 1. This removability of a share is an important feature. In case of its being damaged or broken, its place can be readily supplied by a duplicate one at a trifling cost, and by any ordinary farm-hand, and without deranging or disturbing any other portion of the implement, and they may be removed from time to time as they may wear away.

The plates E E are held in position by brace-rods J, which are secured to the draft-pole A by a single bolt, K, the latter passing through the slot *b* in the draft-pole and through eyes *g* in the brace-rods.

By having the blades H of concave form on their under side, as shown, the upper surfaces of the hills are made or left more rounded and more nearly level than they otherwise would be, and by having the plates E E secured to the cross-bars B B′ by means of the rods F, slots *a*′, and notches *e* in said cross-bars, and the bolts G, they are rendered capable of being very readily adjusted nearer to or farther from each other, and also in a more or less oblique position, as may be desired, the adjustability of the brace-rods also serving to admit of these changes of position and to brace the plates properly whenever they are so adjusted.

The curved support D serves to hold the handles permanently in position, preventing any working or play of the same. This support is made of a single block or piece of wood or other material, and is held to the beam by a single screw-bolt and nut, its two arms being beveled at the top near the ends to receive properly and support the inclined handles G, to each of which it is also secured by a screw-bolt and nut. To render it perfectly firm, it is well to have its base broad enough to rest on the beam throughout its whole breadth.

The blades H H are attached to the plates E E by a bolt, $a^{\times}$, and the inner sides of the blades are provided with a longitudinal rib, *b*, which fits in any one of a series of grooves, $c^{\times}$, in the outer surface of the plates. These grooves we prefer to make radial or converging toward a common center, the center being the axis of bolt $a^{\times}$. By screwing up the bolts $a^{\times}$ the ribs will be firmly held in the grooves and the blades retained firmly at any desired point. (See Fig. 5.) This is also an important feature of the invention, inasmuch as it insures a steady and uniform action of the blades or wings in leveling and rounding off the hills and preventing them from accidentally changing position while the implement is doing its work.

What we claim as new, and as the invention of ALBION WEBB, and desire to secure by Letters Patent, is—

1. Securing the share to a plate in such manner as to be readily removed therefrom or secured thereto, substantially as described.

2. The employment of teeth or cogs as a means of adjustment and holding in position a movable blade, substantially as described.

3. Providing a wing or blade and the part to which it is connected with a rib in one and a series of notches or grooves in the other, to set and hold the blade in position.

4. In combination with such rib and notches, a bolt and nut, or their equivalents, to loosen and tighten the same as desired.

5. Supporting the forward ends of the share-supporting plate by means of screw-threaded rods entering screw-threaded eyes on the plate to admit of lowering or raising the share, substantially as shown and described.

6. Providing the cross-bars with slots, or their equivalents, as and for the purpose described.

7. Providing the cross-bars with notches to receive the eyes of the loops which secure the share-supporting rods in the desired positions.

8. The curved support D, made of a single block, when constructed and applied as and for the purposes described.

R. B. DUNN.
JOHN C. FLINT.

Witnesses:
A. C. FLINT,
E. C. BETT.